United States Patent [19]

White

[11] 3,765,542

[45] Oct. 16, 1973

[54] SELF-ALIGNING OBJECT PLACEMENT APPARATUS

[75] Inventor: William Frederick White, Williston, Vt.

[73] Assignee: International Business Machines Corporation, Armonk, N.Y.

[22] Filed: Apr. 3, 1972

[21] Appl. No.: 240,482

[52] U.S. Cl. ................................ 214/1 BT, 214/309

[51] Int. Cl. ............................................ B65g 47/24

[58] Field of Search .................. 214/1 Q, 1 R, 1 BB, 214/309, 1 BT, 1 B, 1 BS; 294/64, 65

[56] References Cited

UNITED STATES PATENTS

| | | | |
|---|---|---|---|
| 2,695,190 | 11/1954 | Meierjohan | 214/1 BT X |
| 2,217,709 | 10/1940 | Schmidt | 294/65 X |

*Primary Examiner*—Gerald M. Forlenza
*Assistant Examiner*—Frank E. Werner
*Attorney*—D. H. Lefeve et al.

[57] ABSTRACT

An object positioning and placement apparatus capable of engaging the object within a pickup zone, moving the object into a preselected translational and rotary orientation, and placing the oriented object onto a receiving member. The object pickup assembly is freely movable within a pickup zone for locating and engaging the object without the requirement of either precision object placement for pickup or close construction tolerances in the pickup assembly itself. After engaging the object, the object pickup assembly is then brought into contact with a homing member causing the object pickup assembly and the object engaged thereby to assume the preselected translational and rotary orientation with respect to the receiving member for placing the object onto the receiving member.

10 Claims, 5 Drawing Figures

SELF-ALIGNING OBJECT PLACEMENT APPARATUS

BACKGROUND OF THE INVENTION

1. Field of the Invention

This invention relates to an apparatus for object placement, and more particularly to an apparatus for positioning objects onto a receiving means in a preselected translation and rotary orientation.

2. Description of the Prior Art

In recent years, the art of object positioning and placement has experienced a considerable degree of activity and advancement in the more particular technology of microminiature, solid state electronic circuit manufacture. This activity and advancement has been brought about by the more stringent requirements of precision, speed and uniformity required for the mass production of such circuits. Because this invention may be readily utilized in the automated manufacture of such electronic apparatus, it is appropriate to discuss its background in terms of the manufacturing techniques that have been heretofore proposed for microminiature circuit manufacture, although, it will be readily understood by one skilled in the art that the invention disclosed herein is applicable for use in any number of other larger scale environments.

In accurately positioning objects, such as encapsulated circuit modules or semiconductor chips, onto printed circuit substrates for attachement thereto, it has been heretofore proposed to pick up a randomly oriented object, sense the position of the object after it has been picked up, determine from this sensed information the degree and direction of movement by the pickup means that is necessary for correct orientation of the object, make such a correction and place the correctly oriented object onto the printed-circuit substrate.

Although the above approach may be used for accurate and efficient automated object placement, extremely close tolerances are required in implementing those portions of the apparatus necessary for correctly orienting the pickup means based on the information concerning the original position of the chip at the time it was picked up. Not only must such portions of the apparatus be built to extremely close tolerances, but the mechanisms must be capable of precise movement from the pickup step until the object deposition step. Such a system, therefore, may be characterized as a very "tight" apparatus in which no play or backlash can be tolerated. Such an apparatus requires frequent adjustment to maintain its accuracy.

As mentioned above, some type of sensing means is required to determine the position of the pickup means and the object at the time it is picked up so that this information may be used to determine the correction necessary for proper orientation for placement. This sensing means might be mechanical or optical, and either type of sensing system has problems of its own. For example, optical systems sometimes require frequent cleaning of the environment surrounding the photosensitive element so that the proper amount of light may be transmitted to it. Mechanical sensing means have the problem of adding friction to the system and often require frequent adjustment or replacement of parts to maintain proper accuracy.

OBJECTS OF THE INVENTION

Accordingly, it is an object of this invention to pick up and accurately position objects onto a receiving means in a simplified and improved manner.

It is another object of this invention to pick up and accurately position objects onto a receiving means without sensing the original object position.

It is a further object of this invention to pick up and accurately position objects onto a receiving means without frequent readjustment of the pickup and positioning apparatus.

SUMMARY OF THE INVENTION

These and other objects are accomplished by providing an object placement apparatus comprising a relatively freely movable object pickup assembly and a homing member for engagement with the pickup assembly allowing the pickup assembly to assume a preselected translational and rotary orientation with respect to a receiving member.

In its preferred embodiment, the pickup assembly includes an upper cylinder and a lower cylinder, one end of each cylinder having a ground surface. The ground surfaces are abutted against each other and a spring connected to each of the other ends of the cylinders biases the cylinders so that their axes remain substantially parallel, although the axes may be laterally shifted with respect to each other. An object alignment collar having chamferred inner and outer surfaces is mounted on one end of the pair of cylinders. A reciprocating bar moves the cylinders toward an object placed anywhere within a pickup zone and chamferred surfaces on the inside of the object alignment collar cause this collar and the cylinder attached thereto to laterally position themselves for engagement with the object. The cylinders are then moved away from the pickup zone until the outer chamferred surfaces of the object alignment collar engage the homing member. This engagement of the alignment collar with the homing member causes the alignment collar and the cylinder attached thereto to be laterally and rotatably shifted to assume a preselected orientation consistent with that desired for correct placement of the object onto the receiving member. The pickup assembly is then moved toward the receiving member for placement of the object onto the receiving member.

The foregoing and other objects, features, and advantages of the invention will become apparent from the following more particular description of the preferred embodiment of the invention, as illustrated in the accompanying drawing.

DESCRIPTION OF THE PREFERRED EMBODIMENTS

Figure 1:
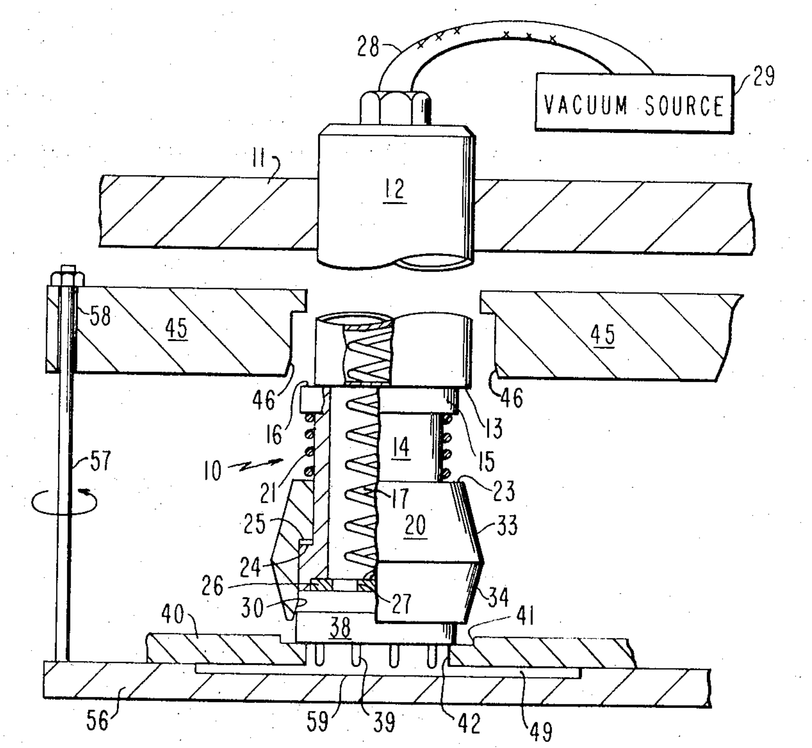
FIG. 1 is a partial cross section view of an object placement apparatus of this invention in which the object pickup assembly is positioned for engagement of the object to be positioned and placed.

Referring now to FIG. 1, the object placement apparatus of this invention broadly comprises object pickup assembly 10 and pickup homing member 45. Pickup assembly 10 includes upper elongated member 12 and lower elongated member 14. In the preferred embodiment, cylinders are used for members 12 and 14, although elongated members of other shapes could readily be utilized for members 12 and 14. It will also be understood that the words upper and lower, used in describing elongated members 12 and 14, are used solely for the sake of convention, since the invention may be practiced with the apparatus situated in positions other than that shown in FIG. 1.

At the lower end of upper elongated member 12 is a flat, ground surface 13. Flange 15 has a flat, ground surface 16 on its upper end. Flange 15 is attached to the upper end of lower elongated member 14, and members 12 and 14 are biased together at surfaces 13 and 16 by tension spring 17. Spring 17 is suitably chosen to bias elongated members 12 and 14 together tightly enough so that they will hold whatever lateral position they are moved to with respect to each other, yet they are not biased together so tightly that movement of member 14 with respect to member 12 can only be accomplished after a substantial force is applied. It will thus be readily understood that spring 17 may be chosen so that when the upper portion of object pickup assembly 10 is fixed, the lower portion of object pickup assembly 10 may be freely moved about for a variety of translational positions, and that the lower portion of pickup assembly 10 will assume the position to which it has been moved until an outside force moves it into another position.

Object alignment collar 20 is slideably mounted at the lower end of lower elongated member 14. Collar 20 is retained on member 14 by the engagement of protrusion 24 on member 14 and recess 25 on collar 20. Collar 20 is normally biased in the "down" position shown in FIG. 1, by compression spring 21 which is situated between the lower face 22 of flange 15 and the upper face 23 of collar 20.

Stop plate 26 is fixedly mounted on the bottom of lower elongated member 14 for attachment of spring 17 to member 14. Stop plate 26 has holes 27 drilled therethrough for engaging and retaining object 38 when elongated members 12 and 14 of object assembly 10 are evacuated by vacuum source 29 connected to elongated member 12 by vacuum line 28.

Object 38 may be an encapsulated circuit module, a semiconductor chip, or any other object which has a flat surface engageable by a vacuum in elongated members 12 and 14. In FIG. 1, object 38 is a circuit module shown with pins 39 extending therefrom. Carrier tray

40 has carrier step 42 extending from hole 41 for supporting object 38.

For positioning object 38 for pickup by object pickup assembly 10, carrier tray 40 is supported by carrier tray support 56. Recess 49 is provided in carrier tray support 56 to prevent object pins 39 from contacting support 56, in the event that pins 39 extend beyond the lower surface of carrier tray 40. One end of rod 57 is rigidly attached to support 56 of pickup homing member 45, so that carrier tray support 56 and carrier tray 40 may be rotated into position underneath object pickup assembly 10. Hole 58, through which rod 57 rotates, is drilled through pickup homing member 45 because homing member 45 is a rigidly mounted member, it being understood that hole 58 might well be drilled through any other rigidly attached, fixed member of the apparatus for mounting rod 57 for rotational movement. It is noted that this represents only one of many means to present object 38 to object pickup assembly 10.

Upper elongated member 12 is rigidly attached to reciprocating bar 11 for vertical movement of pickup assembly 10. When carrier tray 40 is placed under pickup assembly 10 so that an edge or corner of object 38 makes contact with chamferred surface 30 along the inner periphery of alignment collar 20, the lower portion of pickup assembly 10 can move transversely to engage object 38. The limits through which the lower portion of pickup assembly 10 may travel to engage object 38 define the the pickup zone in which object 38 may be placed for engagement by pickup assembly 10. The limitations of this pickup zone will be discussed in greater detail hereinafter.

Figure 2:
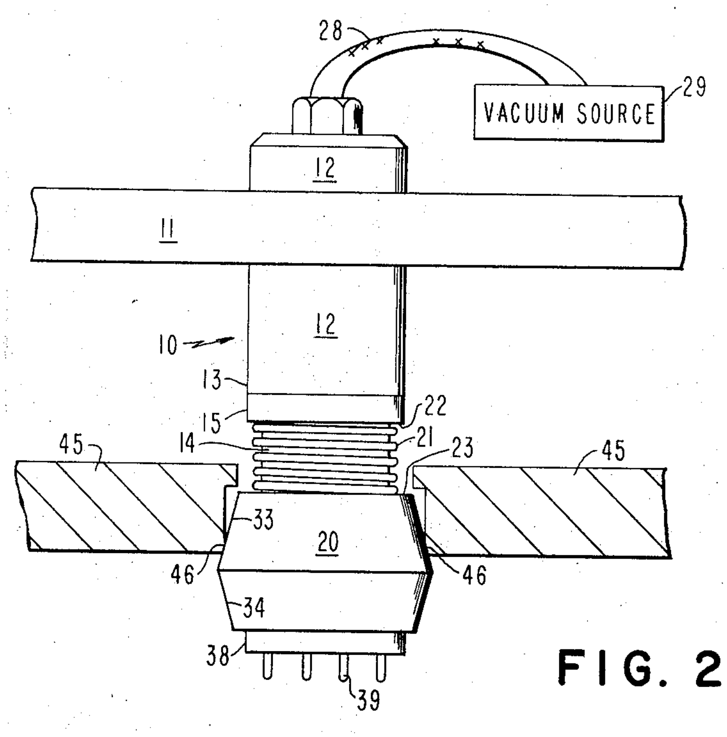
FIG. 2 is a partial cross section view of an object placement apparatus as in FIG. 1, but showing the engagement of the object pickup assembly with a pickup homing member for correct alignment of the object pickup assembly.

Referring now to FIG. 2, pickup assembly 10 is shown in its uppermost position after upward movement of reciprocating bar 11. Chamferred surfaces 33 on the outer, upper portion of object alignment collar 20 are shown in positive engagement with chamferred surfaces 46 on pickup homing member 45. Since pickup homing member 45 is rigidly mounted, the engagement of chamferred surfaces 33 with chamferred surfaces 46 provides translational orientation of the lower portion of pickup assembly 10. It will be noted in FIG. 2 that the axes of elongated members 12 and 14 are now aligned, although they were misaligned in FIG. 1 during pickup of object 38.

Figure 3:
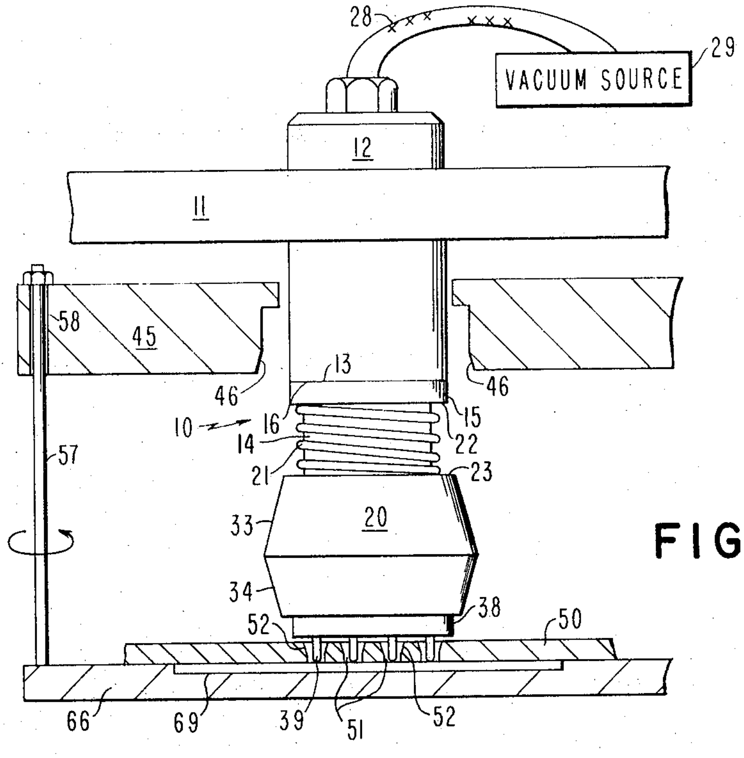
FIG. 3 is a partial cross section view of an object placement apparatus of this invention as in FIGS. 1 and 2, but which shows the object being placed onto a receiving member.

Referring to FIG. 3, reciprocating bar 11 has moved downward, causing pins 39 of object 38 to be inserted in holes 51 of receiving member 50. Receiving member 50 is supported and positioned underneath object pickup assembly 10 by receiving member support 66. Support 66 is provided with recess 69 to prevent pins 39 from contacting support 66, and is shown mounted on rod 57 for rotation into position under object pickup assembly 10 in the same manner as described heretofore with respect to carrier tray support 56.

Although holes 51 of receiving member 50 are shown to be precisely aligned for insertion of pins 39, chamferred surfaces 52 of holes 51 are provided to realign object 38 in the event that receiving member 50 is not precisely placed. This realignment may be effected by the engagement of pins 39 and chamferred surfaces 52 so that the lower portion of pickup assembly 10 may again be transversely and radially shifted for insertion of object 38 into receiving member 50.

Figure 4:
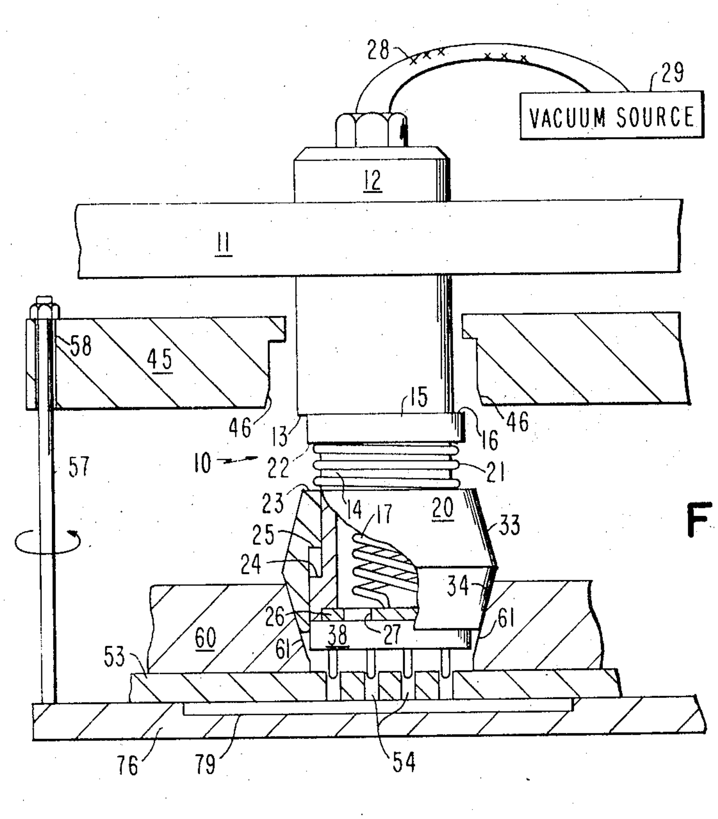
FIG. 4 is a partial cross section view of an object placement apparatus of this invention shown in an alternate embodiment for object placement in which a receiving homing member, aligned with a receiving member, is utilized to orient the object pickup assembly for correct placement of the object.

FIG. 4 shows an alternate embodiment for insertion of object 38 into receiving member 53 in which a receiving homing member 60 is precisely aligned with receiving member 50 so that no chamferred surfaces are required at the tops of holes 54 for positive alignment of object 38 for insertion into receiving member 53. In this embodiment the engagement of chamferred surfaces 34 on the lower, outer periphery of alignment collar 20 and chamferred surfaces 61 on receiving homing member 60 serves two purposes. One purpose served is that this engagement precisely aligns the lower portion of pickup assembly 10 for insertion of object 38 into receiving member 53. It will be noted in FIG. 4 that the axes of elongated members 12 and 14 are offset from each other by this engagement. The other purpose served by this engagement is to stop the travel of alignment collar 20 as reciprocating bar 11 continues to move downward. This downward movement causes elongated member 14 to push object 38 out of collar 20 and into receiving member 53.

It will be further noted in FIG. 4 that receiving member 53 is supported by receiving member support 76 having recess 79, in the same manner as has been heretofore described with respect to carrier tray support 56 and receiving member support 66.

Figure 5:
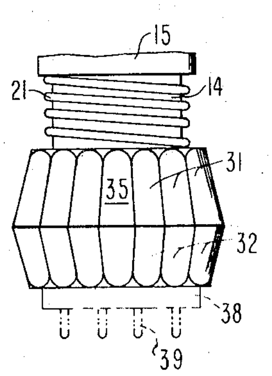
FIG. 5 shows an alternate embodiment of an object pickup assembly of this invention wherein flat surfaces are ground on the ouside of the object alignment collar for engagement with a homing member to provide correct radial orientation of the object pickup assembly.

FIG. 5 shows object alignment collar 35 having upper radial alignment facets 31 and lower radial alignment facets 32 ground on the outer surfaces of collar 35. Facets 31 provide positive radial alignment of collar 35 when collar 35 engages chamferred surfaces 46 of pickup homing member 45. Facets 32 provide positive radial alignment of collar 35 when collar 35 engages chamferred surfaces 61 of receiving homing member 60. Either or both sets of facets may be used on collar 35 for providing positive radial alignment depending on whether a pickup homing member, a receiving homing member, or both homing members are used.

OPERATION

Referring again to FIG. 1, operation of the self-aligning object placement apparatus is begun by an upward movement of reciprocating bar 11. Engagement of chamferred surface 33 on alignment collar 20 and chamferred surface 46 on pickup homing member 45 causes the lower portion of pickup assembly 10 to become homed, so that the axes of elongated members 12 and 14 are substantially coincident. This homing operation allows a pickup zone to be defined as a circle having its center coincident with the axes of members 12 and 14 and its radius equal to the inside radius of the bottom of alignment collar 20 plus the maximum offset of the axes of members 12 and 14 when said members are at the limit of their relative transverse displacement. This pickup zone will lie in a plane perpendicular to the axes of members 12 and 14.

Carrier tray 40, supporting object 38 is placed in the pickup zone by movement of carrier tray support 56 so that no corner or edge of object 38 extends outside the pickup zone.

Reciprocating bar 11 is now moved downward, moving pickup assembly 10 downward until chamferred surface 30 on the inner periphery of alignment collar 20 contacts object 38. Continued downward movement of reciprocating bar 11 causes chamferred surface 30 to guide the lower portion of pickup assembly 10 in a transverse manner so that the lower portion of pickup assembly 10 can "find" and engage object 38, as long as object 38 is within the pickup zone. After the lower portion of pickup assembly 10 has aligned itself to the position of object 38 and has engaged object 38, vacuum supply 29 is actuated to positively hold object 38 against stop plate 26.

Upward movement of reciprocating bar 11 causes pickup assembly 10 to move upward, away from carrier tray 40. Upward movement is continued until the lower portion of pickup assembly 10 is again homed by the engagement of chamferred surfaces 33 and 46 as explained above. The homing step is depicted in FIG. 2, which also shows the engagement of object 38 by collar 20.

At some time after the removal of object 38 from carrier tray 40 by pickup assembly 10, carrier tray 40 is removed from the pickup zone by movement of carrier tray support 56. At some time after the removal of carrier tray 40, receiving member 50 is placed under pickup assembly 10 in lateral alignment with the homed position of the lower portion of pickup assembly 10 by movement of receiving member support 66. After pickup assembly 10 is homed with object 38 engaged thereby, downward movement of reciprocating bar 11 moves object 38 downward toward receiving member 50. If receiving member 50 is precisely aligned with the homed position of pickup assembly 10, continued downward movement of reciprocating bar 11 causes object 38 to be inserted into receiving member 50. Chamferred surfaces 52 on receiving member 50 may be used to guide pins 39 into holes 51 in the event that receiving member 50 may be slightly misaligned with reference to the homed position of pickup assembly 10. The vacuum may be removed from pickup assembly 10 to disengage object 38, and reciprocating bar 11 may be moved upward away from receiving member 50.

As an alternative to providing precise alignment of receiving member 50 with respect to the homed position of pickup assembly 10, in FIG. 4 a receiving homing member is used to correct for substantial misalignment between receiving member 53 and the homed position of pickup assembly 10. It will be noted in FIG. 4 that as object 38 is inserted into receiving member 53, there is a substantial misalignment between the upper and lower portions of pickup assembly 10.

Although substantially no undesired rotation of the lower portion of pickup assembly 10 is encountered in most cases, object alignment collar 35, as in FIG. 5, may be used when radial orientation must be very precise. As explained earlier, radial alignment facets 31 and 32 are engaged by chamferred surfaces 46 and 61 of pickup homing member 45 and receiving member 60, respectively, to insure precise radial orientation. Further, such facets may be provided along the inner periphery of object alignment collar 20 in place of chamferred surface 30 to insure precise orientation of object 38 with respect to object alignment collar 20 as it is initially engaged by alignment collar 20.

While the invention has been particularly shown and described with reference to preferred embodiments, it will be understood by those skilled in the art that the foregoing and other changes in form and detail may be made therein without departing from the spirit and scope of the invention.

What is claimed is:

1. A self-aligning object placement apparatus for positioning an object with respect to a receiving means comprising:

upper and lower elongated members, each of said members having longitudinal axes substantially parallel to each other;

means for biasing an end surface of each of said members together for maintaining placement of one of said members with respect to the other of said members after one of said members has been laterally moved within a pickup zone;

an object alignment collar mounted on one of said members for engaging said object within said pickup zone;

reciprocating means connected to the other of said members for moving both of said members substantially perpendicularly toward and away from said pickup zone;

pickup homing means for moving said alignment collar so that said object engaged thereby is aligned for correct placement with respect to said receiving means, said receiving means being substantially aligned with said pickup homing means;

said reciprocating means causing movement of said elongated members and said alignment collar away from said pickup homing means substantially perpendicularly toward said receiving means for placement of said object onto said receiving means.

2. A self-aligning object placement apparatus for positioning an object with respect to a receiving means as defined in claim 1 further including facets on the inside of said alignment collar for properly radially orienting said object before it is engaged by said alignment collar.

3. A self-aligning object placement apparatus for positioning an object with respect to a receiving means as defined in claim 1 wherein said alignment of said alignment collar by said pickup homing means is effected by the engagement of chamferred surfaces on said object alignment collar and on said pickup homing means.

4. A self-aligning object placement apparatus for positioning an object with respect to a receiving means comprising:

upper and lower elongated members, each of said members having longitudinal axes substantially parallel to each other;

means for biasing an end surface of each of said members together for maintaining placement of one of said members with respect to the other of said members after one of said members has been laterally moved within a pickup zone;

an object alignment collar mounted on one of said members for engaging said object within said pickup zone;

reciprocating means connected to the other of said members for moving both of said members substantially perpendicularly toward and away from said pickup zone;

pickup homing means for moving said alignment collar to the center of said pickup zone;

receiving homing means aligned with respect to said receiving means, said receiving homing means engaging said alignment collar for movement of said collar into substantial alignment with said receiving means;

said reciprocating means causing movement of said elongated members and said alignment collar away from said pickup homing means for placement of said object onto said receiving means.

5. A self-aligning object placement apparatus for positioning an object with respect to a receiving means as defined in claim 4 wherein said alignment of said alignment collar by said receiving homing means is effected by the engagement of chamferred surfaces on said object alignment collar and on said receiving homing means.

6. A self-aligning object placement apparatus for positioning an object with respect to a receiving means comprising:

upper and lower cylinders, each of said cylinders having longitudinal axes substantially parallel to each other;

means for biasing an end surface of each of said cylinders together for maintaining placement of one of said cylinders with respect to the other of said cylinders after one of said cylinders has been laterally moved within a pickup zone;

an object alignment collar mounted on one of said cylinders for engaging said object within said pickup zone, said object alignment collar having facets on the inside of said collar for properly radially orienting said object before it is engaged by said alignment collar;

reciprocating means connected to the other end of said cylinders for moving both of said cylinders substantially perpendicularly toward and away from said pickup zone;

pickup homing means for moving said alignment collar into the center of said pickup zone, said pickup homing means and said object alignment collar having chamferred surfaces for engagement with each other to correctly orient said alignment collar with respect to said pickup zone;

said reciprocating means causing movement of said cylinders and said alignment collar away from said pickup homing means substantially perpendicularly toward said receiving means for placement of said object onto said receiving means;

receiving homing means interposed between said alignment collar and said receiving means for correctly orienting said object engaged by said object alignment collar for correct placement onto said receiving means; and said object and said receiving means being supported under said pickup means by at least one movable support means connected to a frame member of said apparatus.

7. Apparatus for aligning an article engaging member with a target, comprising:

first and second members each having a surface slideable with respect to the surface of the other member, means connected to said first and second members for biasing the two surfaces of said members together, reciprocating means engaging one of said members for moving said members toward and away from the target, aligning means proximate to the target for causing said first and second members to shift axially one with respect to the other in response to motion of said members toward the target, and an article engaging member connected to one of said first and second members.

8. The apparatus of claim 7 in which the target is an article to be engaged.

9. The apparatus of claim 7 in which the target is a receiving means in which an article engaged by said article engaging member is to be precisely positioned and released.

10. The apparatus of claim 7 additionally comprising: homing means for causing said first and second members to assume a predetermined relative position in response to motion of said members away from the target.

* * * * *